UNITED STATES PATENT OFFICE.

LAMBERT THORP, OF CINCINNATI, OHIO.

ANALGESIC BODY AND PROCESS OF MAKING.

1,279,942.  Specification of Letters Patent.  Patented Sept. 24, 1918.

No Drawing.  Application filed March 21, 1918.  Serial No. 223,811.

*To all whom it may concern:*

Be it known that I, LAMBERT THORP, a citizen of the United States, and residing at Cincinnati, in the county of Hamilton and State of Ohio, have invented a new and useful Improvement in Analgesic Bodies and Processes of Making, of which the following specification is a full disclosure.

My invention relates to the production of a new series of bodies, and aims to provide a substance which, while possessing analgesic properties, displays also sedative and hypnotic power.

I have found that the series of compounds to which the general name, anilids of alpha-bromodiethylacetic acid, may be applied, is possessed of analgesic properties and displays also sedative and hypnotic power.

The new series of compounds may be represented by the general formula:—

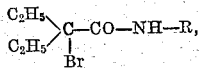

wherein R stands for a phenyl or substituted phenyl group.

I have found that the compounds of the new series, namely, the anilids of alpha-bromodiethylacetic acid may be obtained by the action of alpha-bromodiethylacetyl bromid upon anilins. The compounds, thus obtained, hitherto unknown, are valuable for medicinal purposes as analgesics and sedatives.

The anilids of alpha-bromodiethylacetic acid are colorless, crystalline compounds, very slightly soluble in water; more readily soluble in alcohol or ether. When boiled with a solution of an alkaline hydroxid the anilids of alpha-bromodiethylacetic acid are decomposed, the bromin remaining in solution as an alkaline bromid. The new compounds are possessed of a peculiar, somewhat bitter, taste, and display analgesic and sedative properties, the average dose being five to ten grains, (0.3–0.6 gram).

To prepare the said new anilids of alpha-bromodiethylacetic acid by the method wherein the chemical change involved may be expressed by the equation:—

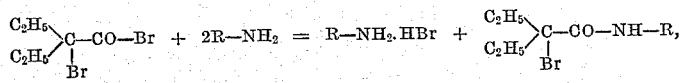

The process may be carried out, for instance, as follows:—

Fourteen parts, by weight, of para-phenetidin, dissolved in one hundred and forty parts, by weight, of dry ether, are placed in a suitable vessel, provided with a reflux condenser. To the above solution are then added gradually thirteen parts, by weight, of alpha-bromodiethylacetyl bromid. During the addition the contents of the vessel should be kept cool by means of running water. The phenetidin hydrobromid is filtered off and from the filtrate the ether is distilled off on the water-bath. The new substance, namely the alpha-bromodiethylacetyl derivative of para-phenetidin, of the formula:—

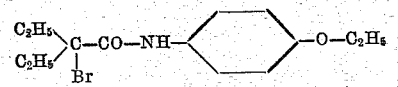

is thus obtained as a mass of yellow crystals, which may be purified by recrystallization from dilute alcohol. Thus purified, the new substance, namely alpha-bromodiethylacetyl-para-phenetidid crystallizes in the form of colorless plates which show a tendency to form aggregates or granular masses and which have a melting point of 54° C.

In an analogous or different manner other anilids of alpha-bromodiethylacetic acid may be obtained.

What I claim as my invention is:—

1. The process of forming anilids of alpha-bromodiethylacetic acid comprising treating anilins with an acyl halid of alpha-bromodiethylacetic acid.

2. The process of forming the para-phenetidid of alpha-bromodiethylacetic acid comprising treating para-phenetidin with an acyl halid of alpha-bromodiethylacetic acid.

3. An anilid having the general formula

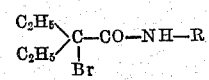

(wherein R stands for a phenyl or substituted phenyl radical) and possessing analgesic and sedative properties.

4. An anilid having the general formula

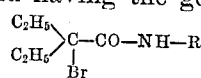

(wherein R stands for a phenyl or substituted phenyl radical) possessing analgesic and sedative properties, and decomposed by means of certain metallic hydroxids.

5. The anilids of alpha-bromodiethylacetic acid having the general formula

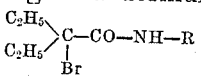

(wherein R stands for a phenyl or substituted phenyl radical) possessing analgesic and sedative properties, decomposed when boiled with a solution of an alkaline hydroxid, the bromin remaining in solution as an alkaline bromid; being colorless, crystalline compounds, slightly soluble in water; more readily soluble in alcohol or ether, and possessed of a peculiar, somewhat bitter, taste.

6. The para-phenetidid of alpha-bromodiethylacetic acid of the formula

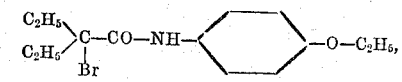

decomposed when boiled with a solution of potassium hydroxid, the bromin remaining in solution as potassium bromid; being a colorless, crystalline compound, slightly soluble in water; readily soluble in alcohol or ether; melting at 54° C.; possessed of a peculiar, somewhat bitter, taste, and possessing analgesic and sedative properties, substantially as described.

In witness whereof, I hereunto subscribe my name, as attested by the two subscribing witnesses.

LAMBERT THORP.

Witnesses:
 LOUISE BECK,
 MILDRED ROEHRER.

Copies of this patent may be obtained for five cents each, by addressing the "Commissioner of Patents, Washington, D. C."